(12) United States Patent
Kamada et al.

(10) Patent No.: US 9,812,236 B2
(45) Date of Patent: Nov. 7, 2017

(54) TEMPERATURE SENSOR AND MANUFACTURING METHOD FOR TEMPERATURE SENSOR

(71) Applicant: Murata Manufacturing Co., Ltd., Nagaokakyo-shi, Kyoto-fu (JP)

(72) Inventors: Yuka Kamada, Nagaokakyo (JP); Toyofumi Kada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 417 days.

(21) Appl. No.: 14/562,981

(22) Filed: Dec. 8, 2014

(65) Prior Publication Data
US 2015/0200043 A1    Jul. 16, 2015

(30) Foreign Application Priority Data
Jan. 16, 2014 (JP) .................. 2014-005565

(51) Int. Cl.
| G01K 7/16 | (2006.01) |
| H01C 7/00 | (2006.01) |
| H01C 1/14 | (2006.01) |
| G01K 7/22 | (2006.01) |
| H01C 17/00 | (2006.01) |

(52) U.S. Cl.
CPC .............. *H01C 7/008* (2013.01); *G01K 7/16* (2013.01); *G01K 7/22* (2013.01); *H01C 1/14* (2013.01); *H01C 17/00* (2013.01); *Y10T 29/49085* (2015.01)

(58) Field of Classification Search
CPC ...... G01K 13/02; G01K 2205/04; G01K 1/14; G01K 7/22; G01K 7/223; H01C 1/1413; H01C 7/008; H01C 17/00; H01C 1/144; Y10T 29/49085
See application file for complete search history.

(56) References Cited

U.S. PATENT DOCUMENTS

| 2004/0135664 A1* | 7/2004 | Hanzawa | G01K 13/02 374/E13.006 |
| 2009/0316752 A1 | 12/2009 | Kawase et al. | |
| 2012/0051397 A1* | 3/2012 | Toudou | G01K 1/12 374/158 |

FOREIGN PATENT DOCUMENTS

WO    2008/156082 A1    12/2008

* cited by examiner

*Primary Examiner* — Manish S Shah
(74) *Attorney, Agent, or Firm* — Keating & Bennett, LLP

(57) ABSTRACT

A manufacturing method for a temperature sensor includes a disposing step and a fixing step. The disposing step includes disposing a thermistor element so that a distal end portion of a first lead wire extends along a first side surface and passes by the first side surface, and a distal end portion of a second lead wire extends along a second side surface. The fixing step includes electrically connecting and fixing the first lead wire to a first outer electrode, and electrically connecting and fixing the second lead wire to a second outer electrode, in a state in which a first corner and a second corner are respectively supported by the first lead wire and the second lead wire.

20 Claims, 10 Drawing Sheets

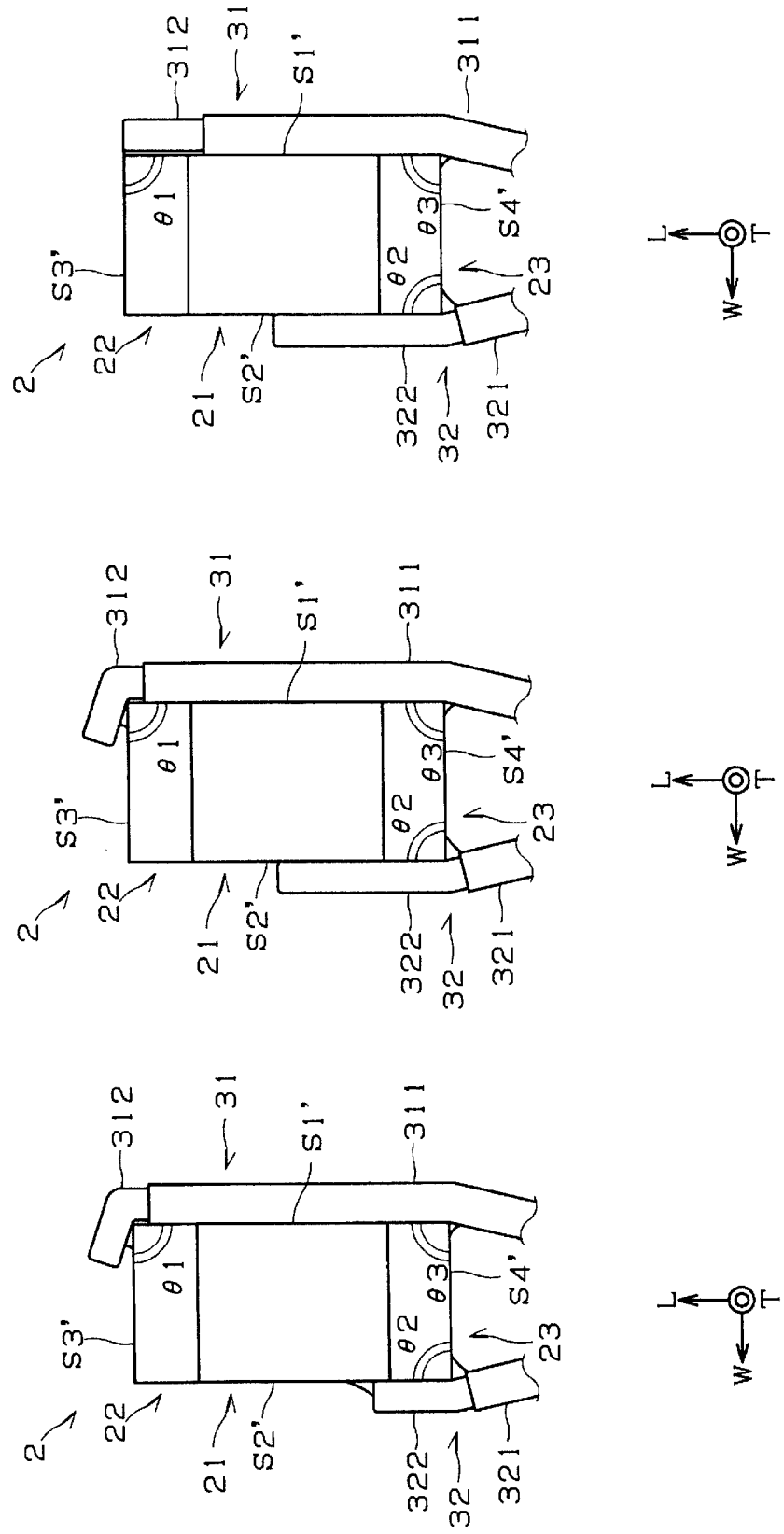

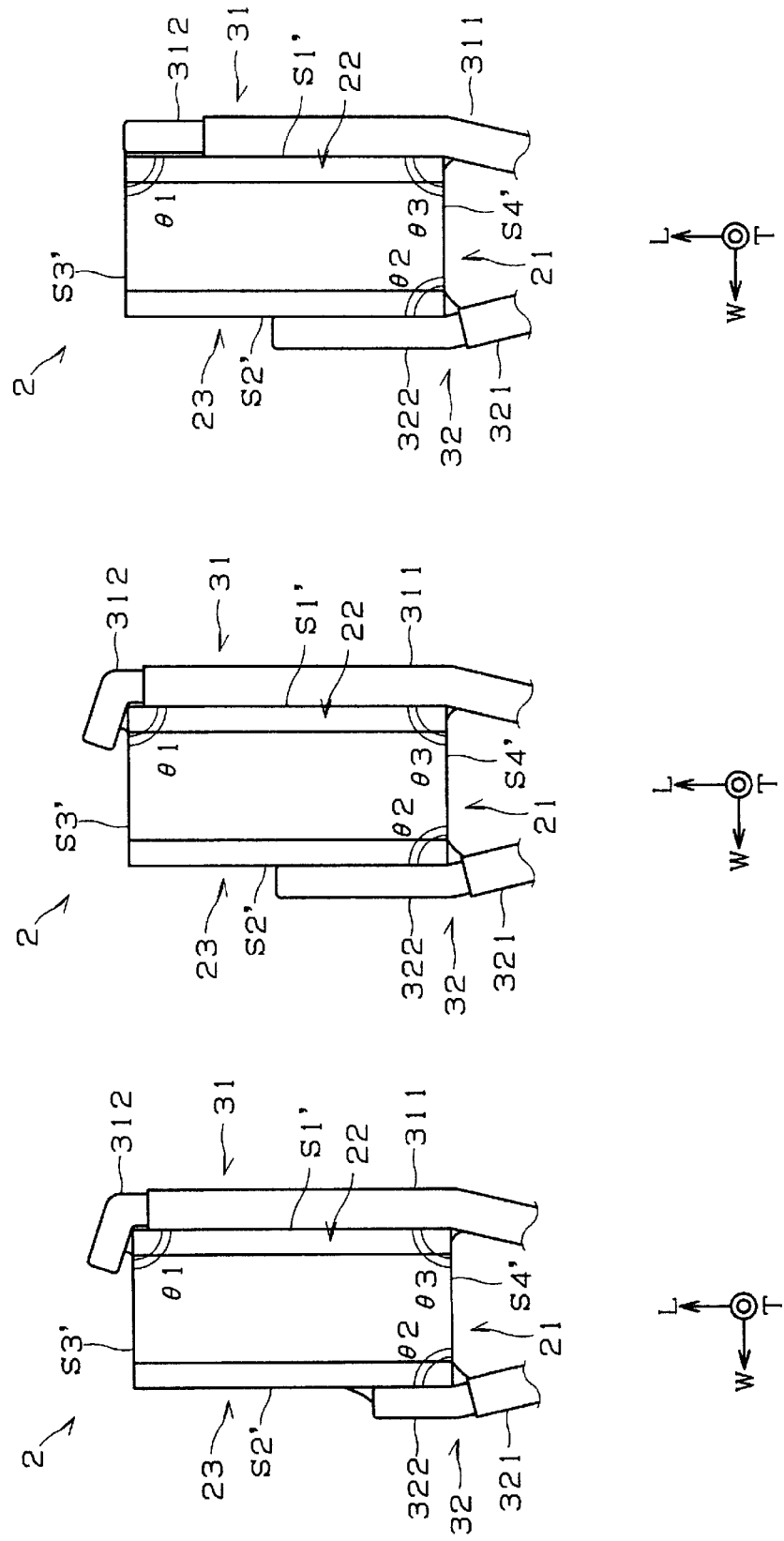

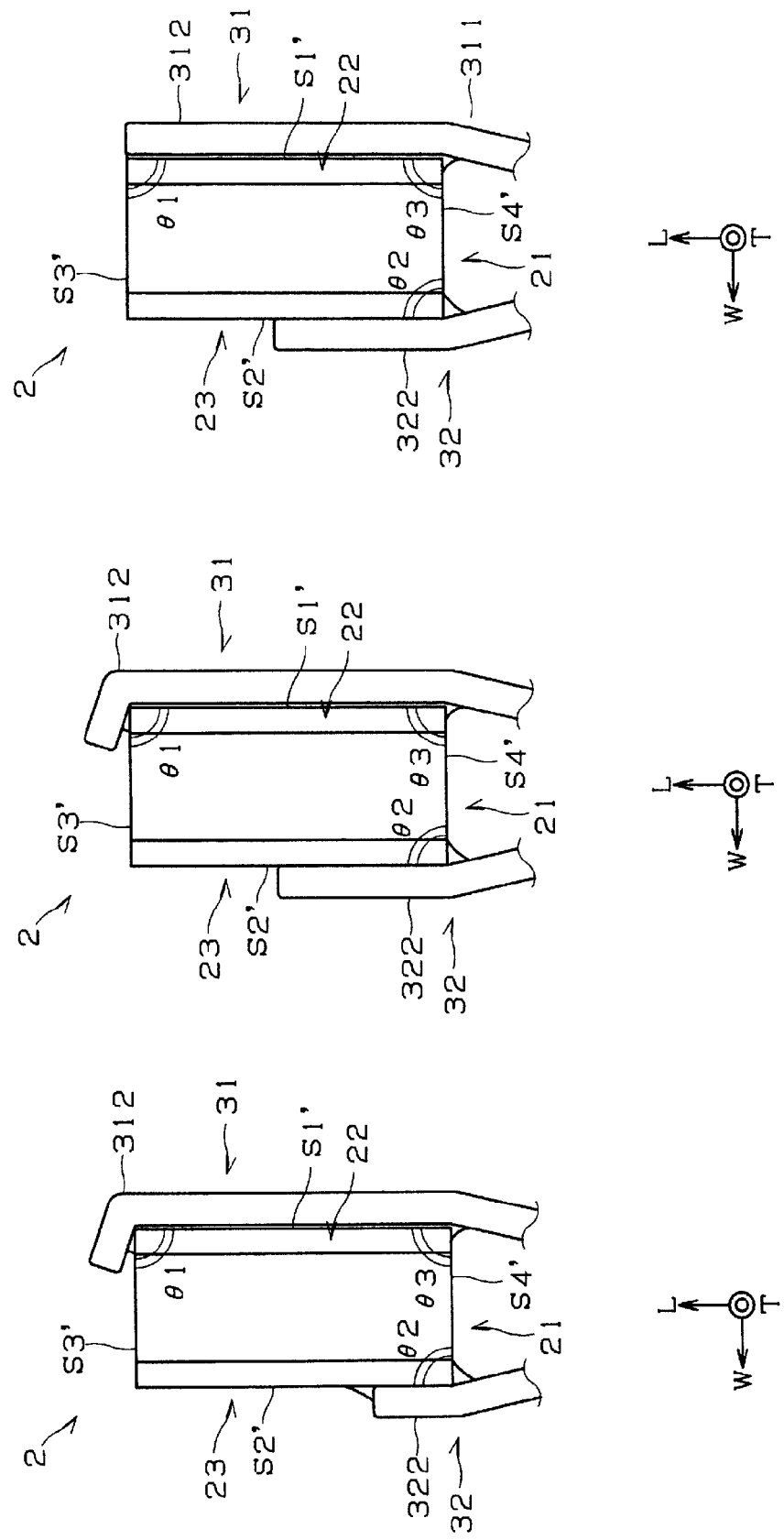

TEMPERATURE SENSOR AND MANUFACTURING METHOD FOR TEMPERATURE SENSOR

BACKGROUND OF THE INVENTION

1. Field of the Invention

The present invention relates to a temperature sensor including a thermistor element, and a manufacturing method for the temperature sensor.

2. Description of the Related Art

In related art, a temperature sensor disclosed in International Publication No. 2008/156082 is one type of temperature sensor. This temperature sensor is manufactured by the following procedure.

First, two lead wires of different lengths are prepared. Next, these lead wires are cut at distal ends thereof. As a result of the cutting, cut surfaces of the respective lead wires are inclined inward to each other, with a metal wire being exposed from the cut surface of each of the lead wires. Next, a thermistor element is disposed so that the side surface of one of the lead wires is attached to the thermistor element in parallel to the longitudinal direction of the thermistor element, and that the distal end of the other lead wire supports a terminal electrode of the thermistor element.

Next, a solder paste is applied to the junction between each of the lead wires and the corresponding terminal electrode. Thereafter, the solder paste is heated with a hot-air heater, causing the solder paste to melt. As a result, the thermistor body is fixed to both of the lead wires.

Next, an insulating member is applied so as to cover the distal end portions of both of the lead wires and the entire thermistor element, and the insulating member is cured. Thereafter, the terminal end portion of each of the lead wires is immersed in a high temperature solder bath, thereby stripping the insulating coat covering this portion, and solder coating is applied.

Through the above steps, the temperature sensor is completed.

In the manufacturing method according to related art, the thermistor element is merely attached to one of the lead wires, and the terminal electrode of the thermistor element is only supported by the distal end of the other lead wire. Therefore, the thermistor element is held by the two lead wires with a relatively weak force. Consequently, at the time of solder paste application or the like, even application of a small external force causes the thermistor element to dislodge from the lead wires. As a result, the percentage of non-defective products (hereinafter, referred to as "yield rate") is low with the manufacturing method according to related art.

SUMMARY OF THE INVENTION

Accordingly, preferred embodiments of the present invention provide a temperature sensor and a manufacturing method for the temperature sensor which allow an improvement in yield rate.

According to a preferred embodiment of the present invention, a method of manufacturing a temperature sensor includes a first disposing step of disposing a first lead wire and a second lead wire side by side, a preparing step of preparing a thermistor element including a body, and a first outer electrode and a second outer electrode that are provided to the body, the thermistor element including a first side surface and a second side surface that are opposite to each other, a third side surface that is adjacent to the first side surface to define a first corner, and a fourth side surface that is adjacent to the second side surface to define a second corner at a position diagonal or substantially diagonal to the first corner, a second disposing step of disposing the thermistor element so that a distal end portion of the first lead wire extends along the first side surface and passes by the first side surface, and a distal end portion of the second lead wire extends along the second side surface, and a fixing step of electrically connecting and fixing the first lead wire to the first outer electrode, and electrically connecting and fixing the second lead wire to the second outer electrode, in a state in which the first corner and the second corner are respectively supported by the first lead wire and the second lead wire.

According to another preferred embodiment of the present invention, a temperature sensor includes a thermistor element that includes a body, and a first outer electrode and a second outer electrode that are provided to the body, the thermistor element including at least a first side surface and a second side surface that are opposite to each other, a third side surface that is adjacent to the first side surface to define a first corner, and a fourth side surface that is adjacent to the second side surface to define a second corner at a position diagonal or substantially diagonal to the first corner, a first lead wire that includes a distal end portion, the distal end portion extending along the first side surface and passing by the first side surface, the first lead wire being electrically connected to the first outer electrode at the first corner, and a second lead wire that includes a distal end portion extending along the second side surface, the second lead wire being electrically connected to the second outer electrode at the second corner.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a first schematic illustration of a modification of the temperature sensor illustrated in FIG. 2.

FIG. 7B is a second schematic illustration of a modification of the temperature sensor illustrated in FIG. 2.

FIG. 7C is a third schematic illustration of a modification of the temperature sensor illustrated in FIG. 2.

DETAILED DESCRIPTION OF THE PREFERRED EMBODIMENTS

Hereinafter, temperature sensors according to preferred embodiments of the present invention will be described with reference to the drawings. Prior to describing a temperature sensor 1 according to a preferred embodiment of the present invention, an L-axis, a W-axis, and a T-axis depicted in some drawings will be defined first. The L-axis, the W-axis, and the T-axis are orthogonal to each other, and indicate the left-right direction (length direction), front-back direction (width direction), and top-bottom direction (height direction) of a thermistor element 2, respectively.

Figure 1:
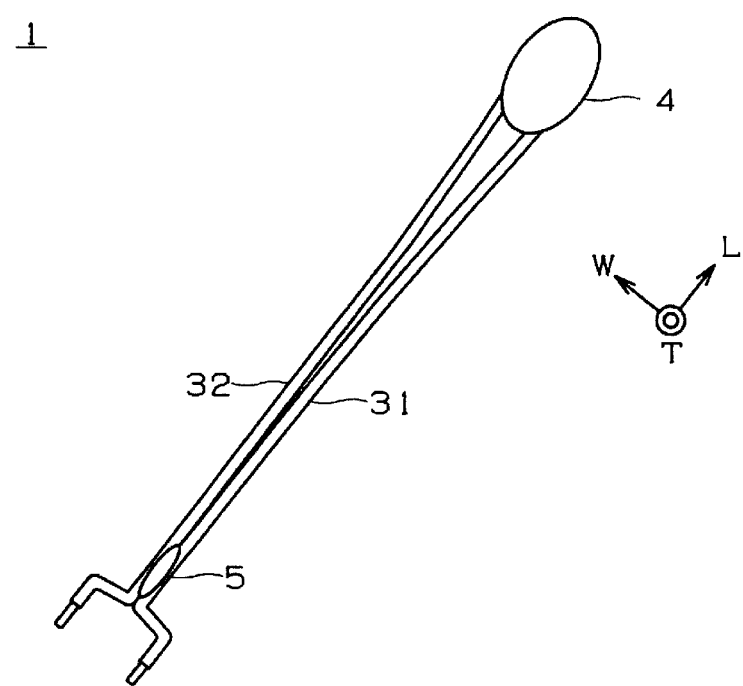
FIG. 1 is a perspective view of a temperature sensor according to a preferred embodiment of the present invention in its completed state.
Figure 2:
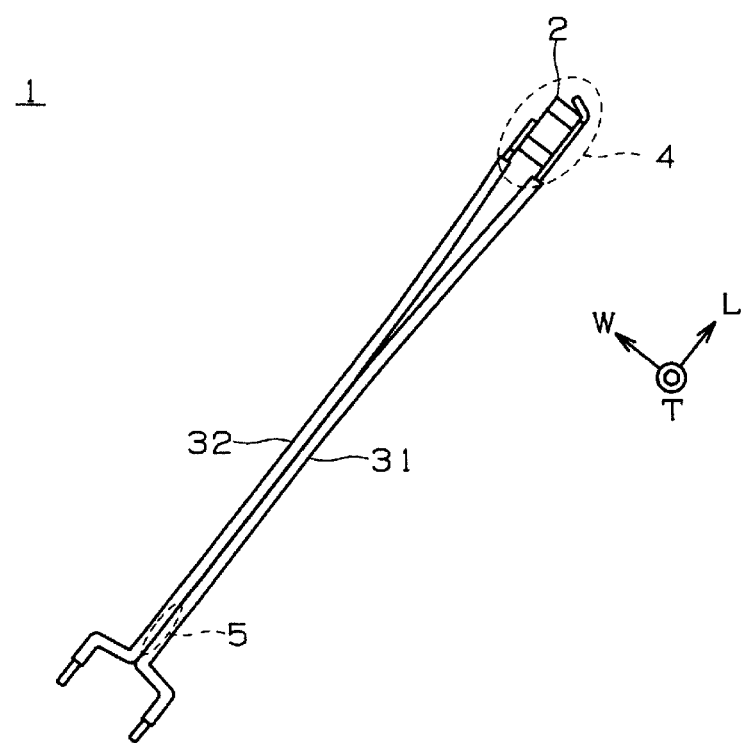
FIG. 2 illustrates in see-through view the distal end portion (a sealing member and its vicinity) of the temperature sensor illustrated in FIG. 1.

As illustrated in FIGS. 1 and 2, the temperature sensor 1 generally includes the thermistor element 2, a first lead wire 31, a second lead wire 32, a sealing member 4, and a fixing member 5. Because the thermistor element 2 and the distal ends of the first and second lead wires 31 and 32 are sealed by the sealing member 4, these portions are not illustrated in FIG. 1. In FIG. 2, only the contours of the sealing member 4 are indicated by a broken line, and the thermistor element 2 and the distal ends of the first and second lead wires 31 and 32 are illustrated in see-through view.

Figure 3:
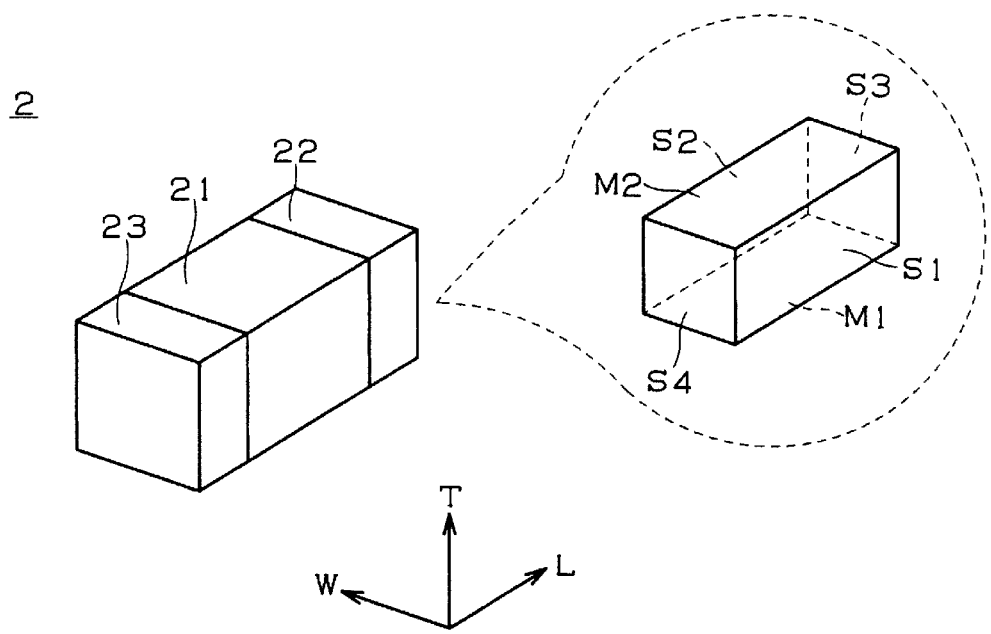
FIG. 3 is an enlarged view of a thermistor element illustrated in FIG. 1.

The thermistor element 2 is, for example, a multilayer chip thermistor. As illustrated in FIG. 3, the thermistor element 2 includes a thermistor body 21, a first outer electrode 22, and a second outer electrode 23.

The thermistor body 21 includes a multilayer body including a plurality of ceramic layers stacked in the T-axis direction. In some cases, a single inner electrode is provided between ceramic layers that are adjacent to each other in the T-axis direction.

The thermistor body 21 has a temperature characteristic such that its resistance varies greatly with changing ambient temperature. In this preferred embodiment, it is assumed that the thermistor body 21 is an NTC thermistor whose resistance decreases with increasing temperature, for example. Such an NTC thermistor can be fabricated from a sintered oxide (sintered ceramic) obtained by mixing and sintering two to four kinds of oxides selected from the group consisting of, for example, manganese (Mn), nickel (Ni), iron (Fe), cobalt (Co), and copper (Cu).

The thermistor body 21 has a size that is standardized by, for example, the Japanese Industrial Standards (JIS). While the size of the thermistor body 21 is not particularly limited, for example, it is assumed that the thermistor body 21 is 1005 size. In this case, the thermistor body 21 preferably has a dimension in the L-axis direction (that is, L-dimension) of about 1.0 mm, and a dimension in the W-axis direction (that is, W-dimension) of about 0.5 mm, for example. Although the dimension in the T-axis direction (that is, T-dimension) is not specified by JIS, the toner T-dimension preferably is, for example, about 0.5 mm. It is to be noted that the L-dimension, the W-dimension, and the T-dimension are all design target values, and may not necessarily be precisely 1.0 mm, about 0.5 mm, and 0.5 mm, respectively. That is, the L-dimension, the W-dimension, and the T-dimension all have tolerances.

As illustrated inside the dotted circle at the right side of FIG. 3, the thermistor body 21 preferably has a rectangular or substantially rectangular parallelepiped shape including a first principal surface M1, a second principal surface M2, a first side surface S1, a second side surface S2, a third side surface S3, and a fourth side surface S4. The first and second principal surfaces M1 and M2 are bottom and top surfaces of the thermistor body 21, respectively, and are opposite to each other at a distance of the T-dimension in the T-axis direction. The first and second side surfaces S1 and S2 are front and back surfaces of the thermistor body 21, respectively, and are opposite to each other at a distance of the W-dimension in the W-axis direction. The third and fourth side surfaces S3 and S4 are front side surface and left side surface of the thermistor body 21, respectively, and are opposite to each other at a distance of the L-dimension in the L-axis direction.

Each of the first and second outer electrodes 22 and 23 includes, for example, a primary coat including silver (Ag) as its main component, a nickel (Ni) plated layer on top of the primary coat, and a tin (Sn) plated layer on top of the Ni-plated layer.

The first outer electrode 22 covers, for example, the right end portion of the thermistor body 21. More specifically, in this preferred embodiment, the first outer electrode 22 covers the respective right end portions of the first and second principal surfaces M1 and M2 and first and second side surfaces S1 and S2, in addition to the entirety of the third side surface S3 of the thermistor body 21.

The second outer electrode 23 covers, for example, the left end portion of the thermistor body 21. More specifically, in this preferred embodiment, the second outer electrode 23 covers the respective left end portions of the first and second principal surfaces M1 and M2 and first and second side surfaces S1 and S2, in addition to the entirety of the fourth side surface S4 of the thermistor body 21. The second outer electrode 23 is located at a predetermined distance in the negative direction of the L-axis with reference to the first outer electrode 22.

Figure 4:
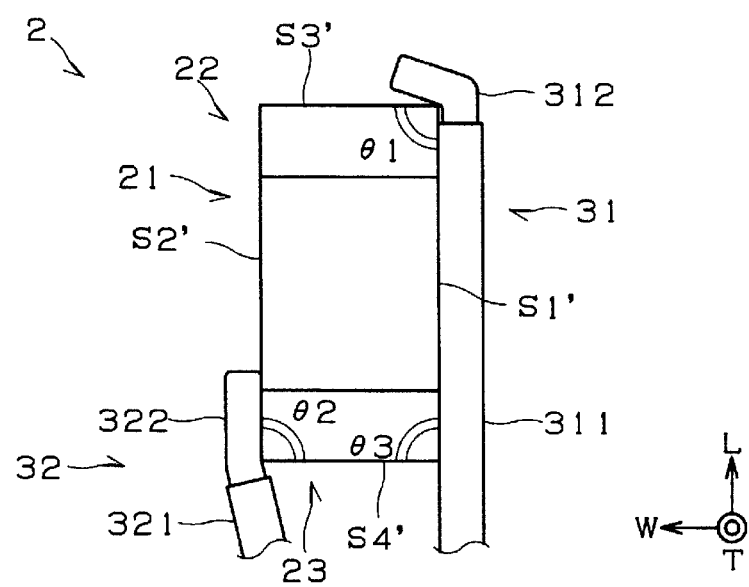
FIG. 4 is an enlarged view of the distal end portion of the temperature sensor illustrated in FIG. 2.

Next, referring to FIG. 4, a first side surface S1', a second side surface S2', a third side surface S3', and a fourth side surface S4' of the thermistor element 2 will be described. FIG. 4 is a schematic plan view of the portion of the thermistor element 2 illustrated in FIG. 2, as seen from the negative direction of the T-axis. The first side surface S1' is a surface that is visible when the thermistor element 2 is seen in plan view from the negative direction of the W-axis. The first side surface S1' is defined by the first side surface S1 of the thermistor body 21, and the front surfaces of the first and second outer electrodes 22 and 23. The second side surface S2' is a surface that is visible when the thermistor element 2 is seen in plan view from the positive direction of the W-axis. The second side surface S2' is defined by the second side surface S2 of the thermistor body 21, and the back surfaces of the first and second outer electrodes 22 and 23. The third side surface S3' is a surface that is visible when the thermistor element 2 is seen in plan view from the positive direction of the L-axis. The third side surface S3' is defined by the right side surface of the first outer electrode 22. The fourth side surface S4' is a surface that is visible when the thermistor element 2 is seen in plan view from the negative direction of the L-axis. The fourth side surface S4' is defined by the left side surface of the second outer electrode 23.

The edge at the front side of the third side surface S3' is substantially the same as the edge at the right side of the first side surface S1'. That is, the first and third side surfaces S1' and S3' are adjacent to each other while sharing this edge, defining a first corner θ1 of about 90°. The edge at the back side of the fourth side surface S4' is the same or substantially the same as the edge at the left side of the second side surface S2'. That is, the second and fourth side surfaces S2' and S4' are adjacent to each other while sharing this edge, defining a second corner θ2 of about 90°. The first and second corners θ1 and θ2 are located diagonal or substantially diagonal to each other in plan view as seen in the toner T-axis direction. Further, the first and fourth side surfaces S1' and S4' are also adjacent to each other at the front side, defining a third corner θ3 of about 90°.

Now, reference will be made to FIGS. 1 and 2 again. The first and second lead wires 31 and 32 are lead wires of the same kind, and preferably have a length of about 15 mm to about 150 mm in the L-axis direction, and a wire diameter of about 0.3 mm, for example. Each of the first and second lead wires 31 and is preferably a single wire to reduce the cost of the temperature sensor 1. More specifically, as illustrated in FIG. 4, the first lead wire 31 is defined by a core wire 312 coated with enamel 311. Likewise, the second lead wire 32 is defined by a core wire 322 coated with enamel 321. The core wires 312 and 322 are preferably made of a metallic material with low thermal conductivity. An example of such a metallic material is an alloy of copper and nickel. In this regard, the thermistor element 2 is required to detect its own ambient temperature. Accordingly, propagation of heat from the first and second lead wires 31 and 32 to the thermistor element 2 is undesirable from the viewpoint of detecting ambient temperature. For this reason, instead of copper that has a relatively high thermal conductivity, an alloy of copper and nickel is used for the core wires 312 and 322.

The first and second lead wires 31 and 32 described above are disposed side by side in the W-axis direction, for example. The thermistor element 2 is secured in place while being sandwiched between the distal end portions of the first and second lead wires 31 and 32. Hereinafter, a more detailed description will be made of how the thermistor element 2 is mounted.

From the viewpoint of improving the yield rate of the manufacturing process, as illustrated in FIG. 4, the distal end portion of the first lead wire 31 extends on and along the first side surface S1' so as to pass by the first side surface S1' from the left end to the right end. Further, the distal end portion of the first lead wire 31 is electrically connected and fixed to the first outer electrode 22 by solder. For these reasons, in the distal end portion of the first lead wire 31, the coating of the enamel 311 is removed for at least the location to be connected to the first outer electrode 22. Further, in the distal end portion of the first lead wire 31, the coating of the enamel 311 is left for the location where the first lead wire 31 extends on and along the portion of the first side surface S1' corresponding to the thermistor body 21 and the second outer electrode 23. This ensures electrical insulation between the first lead wire 31 and the second outer electrode 23. From the viewpoint of improving the yield rate, it is further preferable that the distal end portion of the first lead wire 31 be bent at the corner θ1 toward the third side surface S3', at an angle slightly smaller than 90°.

The distal end portion of the second lead wire 32 extends on and along the second side surface S2' so as to pass by the portion of the second side surface S2' corresponding to the second outer electrode 23 from the left end to the right end. Further, the distal end portion of the second lead wire 32 is electrically connected and fixed to the second outer electrode 23 by solder. For these reasons, in the distal end portion of the second lead wire 32, the coating of the enamel 321 is removed for at least the location to be connected to the second outer electrode 23.

It is further preferable that the distal end portion of the second lead wire 32 be bent at the corner θ2 toward the fourth side surface S4' at an angle slightly smaller than 90°.

For each of the first and second lead wires 31 and 32, the coating of the enamel 311 or 321 is removed from the area up to, for example, about 5 mm from its proximal end, and the area is coated with solder.

The sealing member 4 is formed of a resin material having electrical insulating property. The sealing member 4 seals the thermistor element 2 and the distal end portions of the first and second lead wires 31 and 32 to protect the thermistor element 2.

The fixing member 5 is located on the distal end side with respect to the solder-coated portion in the proximal end portion of each of the first and second lead wires 31 and 32. The fixing member 5 is, for example, an adhesive made of resin. The fixing member 5 fixes the first and second lead wires 31 and 32 to each other so that these lead wires do not separate.

Figure 5:
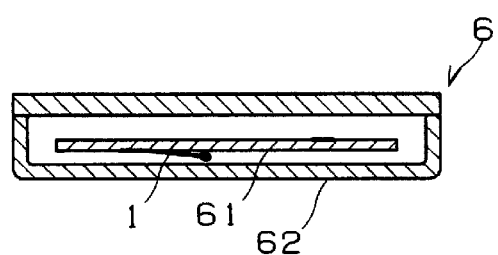
FIG. 5 schematically illustrates an example of application of the temperature sensor illustrated in FIG. 1.

The temperature sensor 1 mentioned above is configured to be adapted for a variety of applications. For example, as illustrated in FIG. 5, the temperature sensor 1 is used to measure the temperature of the space between a circuit board 61 and a casing 62 of an electronic apparatus 6.

Next, a non-limiting example of a manufacturing method for the temperature sensor 1 mentioned above will be described with reference to FIGS. 6A and 6B. First, in a first disposing step, as illustrated at the left end in FIG. 6A, the first and second lead wires 31 and 32 are disposed side by side. Next, as illustrated second from the left in FIG. 6A, the first lead wire 31 is cut so as to be slighter longer than the second lead wire 32. Next, as illustrated third from the left in FIG. 6A, the enamel coating at the distal end of each of the first and second lead wires 31 and 32 is removed. Next, as illustrated fourth from the left in FIG. 6A, in a bending step, the distal end portions of the first and second lead wires 31 and 32 are bent. More specifically, the distal end portion of the first lead wire 31 is bent so as to extend toward the third side surface S3' at the first corner θ1 when the thermistor element 2 is inserted. Further, the distal end of the second lead wire 32 is bent so as to extend toward the fourth side surface S4' at the second corner θ2 when the thermistor element 2 is inserted.

Figure 6A:
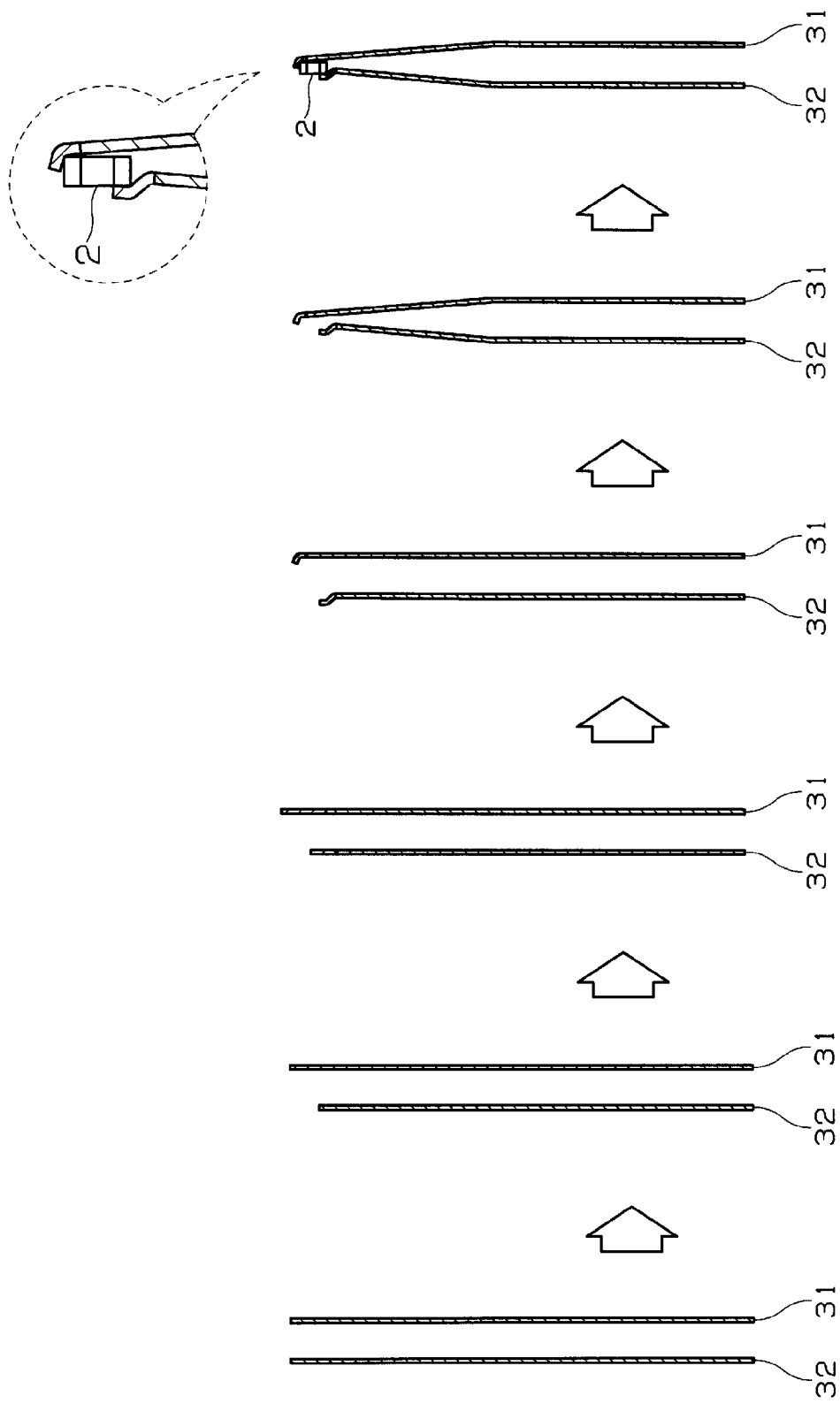
FIG. 6A is a first schematic illustration of a manufacturing process for the temperature sensor illustrated in FIG. 1.

Next, as illustrated fifth from the left in FIG. 6A, in a curving step, the distal end of the first lead wire 31 and the distal end of the second lead wire 32 are brought inwards and closer to each other.

Next, as illustrated sixth from the left in FIG. 6A, in a preparing step, the thermistor element 2 (see FIG. 4) including the thermistor body 21 provided with the first and second outer electrodes 22 and 23 is prepared. As mentioned above, the thermistor element 2 includes the first and third side surfaces S1' and S3' that define the first corner θ1, and the second and fourth side surface S2' and S4' that define the second corner θ2 at a position diagonal to the first corner θ1. The first and fourth side surfaces S1' and S4' further define the third corner θ3.

Next, as illustrated sixth from the left in FIG. 6A, in a second disposing step, the thermistor element 2 is inserted between the distal ends of both the first and second lead wires 31 and 32. At this time, as described above with reference to FIG. 4, the thermistor element 2 is disposed so that the distal end portion of the portion that is to become the first lead wire extends along the first side surface S1' of the thermistor element 2 and passes by the first side surface S1', and that the distal end portion of the portion that is to become the second lead wire 32 extends along the second side surface S2'. Further, in this preferred embodiment, preferably, the distal end portions of the first and second lead wires 31 and 32 are bent. In this case, the bent portion at the distal end of the first lead wire 31 holds the first corner θ1 of the thermistor element 2, and the bent portion at the distal end of the second lead wire 32 holds the second corner θ2 of the thermistor element 2.

Figure 6B:
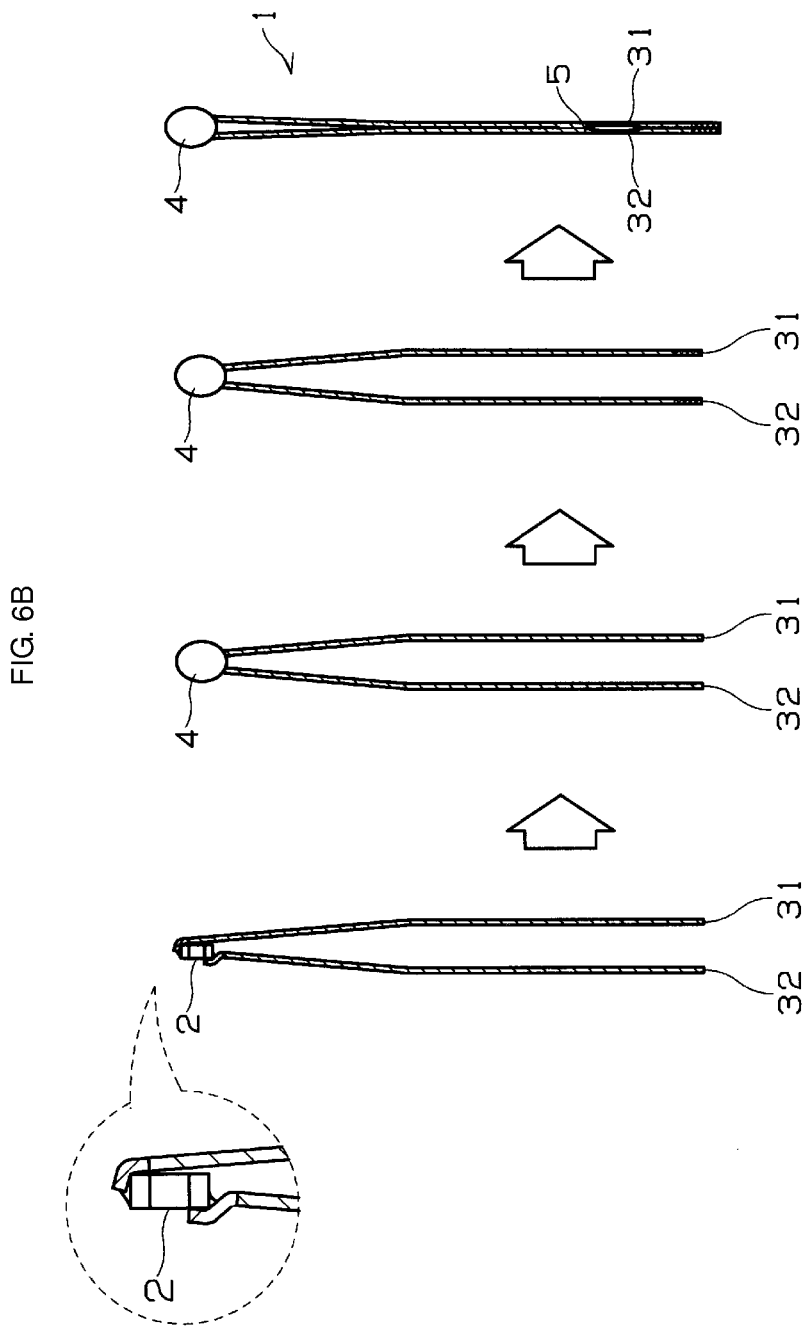
FIG. 6B is a second schematic illustration of the manufacturing process for the temperature sensor illustrated in FIG. 1.

Next, as illustrated at the left end in FIG. 6B, in a fixing step, the thermistor element 2 is fixed to the distal ends of both the first and second lead wires 31 and 32 by solder. More specifically, the first lead wire 31 is electrically connected and fixed to the first outer electrode 22 in a state in which the first and second corners θ1 and θ2 are supported by the distal ends of the first and second lead wires 31 and 32, respectively. Substantially simultaneously with this process, the second lead wire 32 is electrically connected and fixed to the second outer electrode 23. At this time, more preferably, the third corner θ3 of the thermistor element 2 is also supported by the first lead wire 31.

Next, as illustrated second from the left in FIG. 6B, to form the sealing member 4, the thermistor element 2 and the distal end portions of the first and second lead wires 31 and 32 are covered with an insulating resin material. Thereafter, the insulating resin material is applied with coating as required, and then cured.

Next, as illustrated third from the left in FIG. 6B, the proximal end portion of each of the first and second lead wires 31 and 32 is immersed in a high temperature solder to remove the enamel coating from this portion, and a solder coating is applied to the portion that is to become the proximal end of each of the first and second lead wires 31 and 32. Thereafter, as illustrated fourth from the left in FIG. 6B, the portions of the first and second lead wires 31 and 32 which are located on the distal end side with respect to the solder coating are fixed to each other with an adhesive or the like, and the fixing member 5 is formed.

As mentioned above, in the manufacturing process for the temperature sensor 1 according to this preferred embodiment, in the curving step, the distal ends of the first and second lead wires 31 and 32 are brought inwards and closer to each other. Thereafter, in the second disposing step, the thermistor element 2 is inserted between the distal ends of both the first and second lead wires 31 and 32. At this time, as described above with reference to FIG. 4, the thermistor element 2 is disposed so that the distal end portion of the first lead wire 31 extends along the first side surface S1' of the thermistor element 2 and passes by the first side surface S1', and that the distal end portion of the portion that is to become the second lead wire 32 extends along the second side surface S2'.

Therefore, after the second disposing step, the distal ends of the first and second lead wires 31 and 32 sandwich and support the first and second corners θ1 and θ2 of the thermistor element 2 from the positive direction and negative direction of the W-axis, respectively. At this time, the distal end of the first lead wire 31 passes by the first side surface S1', and the distal end of the second lead wire 32 extends along the second side surface S2', thus increasing the contact area between the first lead wire 31 and the first side surface S1' and the contact area between the second lead wire 32 and the second side surface S2' in comparison to related art. Therefore, the clamping force by the first and second lead wires 31 and 32 is significantly increased. As a result, dislodging of the thermistor element 2 from the first and second lead wires 31 and 32 in the fixing step or the like is significantly reduced or prevented, making it possible to provide a manufacturing method for the temperature sensor 1 with improved yield rate.

In this preferred embodiment, preferably, the distal end portion of the first lead wire 31 is bent toward the third side surface S3', and the distal end portion of the second lead wire 32 is bent toward the fourth side surface S4'. Therefore, the bent portion of the first lead wire 31 holds the first corner θ1 in such a way as to cover the first corner θ1, and the bend portion of the second lead wire 32 holds the second corner θ2 in such a way as to cover the second corner θ2. As a result, the first and second lead wires 31 and 32 are able to hold the thermistor element 2 in a more stable manner. Consequently, dislodging of the thermistor element 2 from the first and second lead wires 31 and 32 in the fixing step or the like is significantly reduced or prevented, making it possible to provide a manufacturing method for the temperature sensor 1 with improved yield rate.

In the above preferred embodiments, the thermistor element 2 preferably is an NTC thermistor, for example. However, this should not be constructed restrictively. The thermistor element 2 may be a PTC thermistor, for example. In this case, the thermistor body 21 is typically made from a sintered ceramic obtained by mixing a predetermined amount of rare earth with barium titanate ($BaTiO_3$) and sintering the mixture, for example.

In the above preferred embodiments, the thermistor element 2 is described as a multilayer chip thermistor, for example. However, this should not be construed restrictively. The thermistor element 2 may be a single-chip thermistor, for example.

The thermistor element 2 may not necessarily be 1005 size but may be in 3225 size, 3216 size, 2012 size, 1608 size, 0603 size, or 0402 size, for example. For these sizes, dimensions such as the L-dimension are as summarized in Table below.

TABLE

| Size of Thermistor Element 2 | | | |
| --- | --- | --- | --- |
| Size | L-dimension [mm] | W-dimension [mm] | T-dimension [mm] |
| 3225 | 3.2 | 2.5 | 1.0 |
| 3216 | 3.2 | 1.6 | 1.0 |
| 2012 | 2.0 | 1.2 | 1.0 |
| 1608 | 1.6 | 0.8 | 0.4 |
| 1005 | 1.0 | 0.5 | 0.25 |
| 0603 | 0.6 | 0.3 | 0.15 |
| 0402 | 0.4 | 0.2 | 0.1 |

In the above preferred embodiments, the first and second lead wires 31 and 32 preferably are fixed to each other by the fixing member 5. However, this should not be construed restrictively. The first and second lead wires 31 and 32 may be twisted so that these lead wires do not separate.

In the above preferred embodiments, the first and second lead wires 31 and 32 have the core wires 312 and 322 coated with the enamels 311 and 321, respectively. However, this should not be construed restrictively. In the first and second lead wires 31 and 32, the enamels 311 and 321 may be further coated with vinyl or the like.

Next, several modifications of the temperature sensor 1 will be described with reference to FIGS. 7A to 7C. In the example illustrated in FIG. 4, the distal end portion of the first lead wire 31 preferably is bent at the first corner θ1 toward the third side surface S3', and the distal end portion of the second lead wire 32 preferably is bent at the second corner θ2 toward the fourth side surface S4'. However, this should not be construed restrictively. As illustrated at the left end in FIG. 7A, in the temperature sensor 1, the distal end portion of the first lead wire 31 may be additionally bent at the third corner θ3 toward the fourth side surface S4' at an angle smaller than 90°. This makes it possible to improve the holding of the thermistor element 2 by the first and second lead wires 31 and 32.

In the example illustrated in FIG. 4, the distal end portion of the second lead wire 32 preferably extends along the second side surface S2' so as to pass by the portion of the second side surface S2' corresponding to the second outer electrode 23 from the left end to the right end. However, this should not be construed restrictively. As illustrated in the middle in FIG. 7A, the distal end portion of the second lead wire 32 may be extended to a position on the second side surface S2' near the boundary between the first outer electrode 22 and the thermistor body 21, as long as the distal end portion of the second lead wire 32 does not abut on the first outer electrode 22. As a result, the holding force of the second lead wire 32 improves.

In the example illustrated in FIG. 4, the distal end portion of the first lead wire 31 preferably is bent at the first corner θ1 toward the third side surface S3'. However, as illustrated at the right end in FIG. 7A, the distal end portion of the first lead wire 31 may not be bent at the first corner θ1.

In the foregoing example, in the thermistor element 2, the first and second outer electrodes 22 and 23 preferably are opposite to each other in the L-axis direction. However, this should not be construed restrictively. As illustrated in FIG. 7B, the first and second outer electrodes 22 and 23 may be opposite to each other in the W-axis direction. In this case, as illustrated in FIG. 7C, in the distal end portions of the first and second lead wires 31 and 32, the enamels 311 and 321 may be removed from the location where the first and second lead wires 31 and 32 extend on the first and second outer electrodes 22 and 23, respectively.

The temperature sensor and the manufacturing method for the temperature sensor according to various preferred embodiments of the present invention and modifications thereof achieve improvements in yield rate, and are suitable for use in electronic equipment or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A manufacturing method for a temperature sensor, comprising:
   a first disposing step of disposing a first lead wire and a second lead wire side by side;
   a preparing step of preparing a thermistor element including a body, and a first outer electrode and a second outer electrode that are provided to the body, the thermistor element including:
      a first side surface and a second side surface that are opposite to each other;
      a third side surface that is adjacent to the first side surface to define a first corner; and
      a fourth side surface that is adjacent to the second side surface to define a second corner at a position diagonal or substantially diagonal to the first corner;
   a second disposing step of disposing the thermistor element so that a distal end portion of the first lead wire extends along and is in contact with an entire length of the first side surface and passes by the first side surface, and a distal end portion of the second lead wire extends along and is in contact with the second side surface; and
   a fixing step of electrically connecting and fixing the first lead wire to the first outer electrode, and electrically connecting and fixing the second lead wire to the second outer electrode, in a state in which the first corner and the second corner are respectively supported by the first lead wire and the second lead wire.

2. The manufacturing method for a temperature sensor according to claim 1, wherein
   the first side surface is further adjacent to the fourth side surface to define a third corner; and
   in the fixing step, both the first corner and the third corner are supported by the first lead wire, and the second corner is supported by the second lead wire.

3. The manufacturing method for a temperature sensor according to claim 1, further comprising, prior to the second disposing step, a bending step of bending the distal end portion of the first lead wire at the first corner toward the third side surface.

4. The manufacturing method for a temperature sensor according to claim 3, wherein the bending step further includes bending the distal end portion of the second lead wire at the second corner toward the fourth side surface.

5. The manufacturing method for a temperature sensor according to claim 1, further comprising the step of sealing the thermistor element and the distal ends of the first and second lead wires with a sealing member.

6. The manufacturing method for a temperature sensor according to claim 1, wherein the thermistor element is a multilayer chip thermistor.

7. The manufacturing method for a temperature sensor according to claim 1, wherein the thermistor element is one of an NTC thermistor and a PTC thermistor.

8. The manufacturing method for a temperature sensor according to claim 1, wherein each of the first and second lead wires includes a core wire coated with an enamel.

9. The manufacturing method for a temperature sensor according to claim 3, wherein the bending step is performed such that the distal end portion of the first lead wire is bent an angle of less than about 90° at the first corner toward the third side surface.

10. The manufacturing method for a temperature sensor according to claim 4, wherein the bending step is performed such that the distal end portion of the second lead wire is bent an angle of less than about 90° at the second corner toward the fourth side surface.

11. A temperature sensor comprising:
   a thermistor element including a body, and a first outer electrode and a second outer electrode that are provided to the body, the thermistor element including at least:
      a first side surface and a second side surface that are opposite to each other;
      a third side surface that is adjacent to the first side surface to define a first corner; and
      a fourth side surface that is adjacent to the second side surface to define a second corner at a position diagonal or substantially diagonal to the first corner;
   a first lead wire that includes a distal end portion, the distal end portion extending along and being in contact with an entire length of the first side surface and passing by the first side surface, the first lead wire being electrically connected to the first outer electrode at the first corner; and
   a second lead wire that includes a distal end portion extending along and being in contact with the second side surface, the second lead wire being electrically connected to the second outer electrode at the second corner.

12. The temperature sensor according to claim 11, wherein the distal end portion of the first lead wire is bent at the first corner toward the third side surface.

13. The temperature sensor according to claim 11, wherein the distal end portion of the second lead wire is bent at the second corner toward the fourth side surface.

14. The temperature sensor according to claim 11, wherein each of the first lead wire and the second lead wire is a single wire.

15. The manufacturing method for a temperature sensor according to claim 11, further comprising a sealing member configured to seal the thermistor element and the distal ends of the first and second lead wires.

16. The temperature sensor according to claim 11, wherein the thermistor element is a multilayer chip thermistor.

17. The temperature sensor according to claim 11, wherein the thermistor element is one of an NTC thermistor and a PTC thermistor.

18. The temperature sensor according to claim 11, wherein each of the first and second lead wires includes a core wire coated with an enamel.

19. The temperature sensor according to claim 11, wherein the distal end portion of the first lead wire is bent at an angle of less than about 90° the first corner toward the third side surface.

20. The temperature sensor according to claim 11, wherein the distal end portion of the second lead wire is bent an angle of less than about 90° at the second corner toward the fourth side surface.

\* \* \* \* \*